United States Patent
Keenan

(10) Patent No.: US 6,921,564 B1
(45) Date of Patent: Jul. 26, 2005

(54) INSULATION MODULE, SYSTEM AND METHOD FOR INSTALLATION AND MANUFACTURE

(75) Inventor: Brian Keenan, Mount Pleasant (AU)

(73) Assignee: Kaefer Integrated Services Pty Ltd, Perth (AU)

(*) Notice: Subject to any disclaimer, the term of this patent is extended or adjusted under 35 U.S.C. 154(b) by 0 days.

(21) Appl. No.: 09/674,688

(22) PCT Filed: May 4, 1999

(86) PCT No.: PCT/AU99/00328

§ 371 (c)(1),
(2), (4) Date: Feb. 27, 2001

(87) PCT Pub. No.: WO99/57481

PCT Pub. Date: Nov. 11, 1999

(30) Foreign Application Priority Data

May 4, 1998 (AU) .............................................. PP3326
Apr. 30, 1999 (AU) .............................................. 26034/99

(51) Int. Cl.⁷ ............................. B32B 1/08; F16L 9/147; F17C 3/04; F17C 13/10
(52) U.S. Cl. ................... 428/36.91; 428/36.9; 138/149; 138/141; 138/157; 138/158; 138/163; 285/123.1; 285/123.15; 285/904; 137/375; 220/560.12; 220/560.15; 220/592.01; 220/592.24
(58) Field of Search ............................ 428/36.91, 36.9; 138/141, 149, 157, 158, 163; 285/123.1, 123.15, 904; 137/375; 220/560.12, 560.15, 592.01, 592.24

(56) References Cited

U.S. PATENT DOCUMENTS

| | | | |
|---|---|---|---|
| 2,550,465 A | 4/1951 | Gorski | 154/44 |
| 2,962,402 A | 11/1960 | Sweeney | 154/44 |
| 3,425,456 A | 2/1969 | Schibig | 138/162 |
| 3,598,157 A | * 8/1971 | Farr et al. | 138/157 |

(Continued)

FOREIGN PATENT DOCUMENTS

| | | | |
|---|---|---|---|
| AU | 59354/80 | 1/1981 | |
| AU | 13469/95 | 8/1995 | ............. E04B/1/74 |
| DE | 203591 | 10/1983 | ............. E04B/1/74 |
| DE | 37 30 357 | 3/1989 | |
| DE | 297 06 323 | 7/1997 | |
| DE | 196 31 291 | 2/1998 | ........... F16L/59/12 |
| FR | 1 159 733 | 7/1958 | |
| FR | 2613814 | 10/1988 | ........... F16L/59/12 |
| FR | 2 704 930 | 11/1994 | |
| FR | 2752191 | 2/1998 | ............. B32B/7/02 |
| GB | 2 283 798 | 5/1995 | |
| GB | 2296749 | 7/1996 | ........... F16L/59/02 |
| WO | WO 00/05533 | 2/2000 | ........... F16L/59/12 |
| WO | WO 00/025058 | 5/2000 | ........... F16L/59/02 |

OTHER PUBLICATIONS

Patent Abstracts of Japan, JP 07–293786 (Dai Nippon) Nov. 1995 (1 page).

(Continued)

Primary Examiner—Harold Pyon
Assistant Examiner—Chris Bruenjes
(74) Attorney, Agent, or Firm—Synnestvedt & Lechner LLP

(57) ABSTRACT

A pre-formed insulation module is disclosed having a part cylinder body. The body includes an unstriated insulation layer formed of a rigid insulating material substantially uniform in composition and density over its cross section. The insulation layer has an inner surface adjacent to a surface of a component to be insulated, and an outer surface generally concentric to the inner surface. A substantially non-fibrous resilient cladding layer shaped to the body is directly adhered to the insulation layer at the outer surface. Connection means are disposed along the length of the body for connecting with a further insulation module, wherein the insulation and cladding layers of each module are brought into relative contact along the contacting surfaces of the modules to insulate a portion of the component.

19 Claims, 3 Drawing Sheets

U.S. PATENT DOCUMENTS

| | | | | |
|---|---|---|---|---|
| 3,929,166 A | * | 12/1975 | Westerheid | 138/149 |
| 4,122,640 A | | 10/1978 | Commins et al. | 52/248 |
| 4,287,245 A | | 9/1981 | Kikuchi | 428/36 |
| 4,436,119 A | | 3/1984 | Shahan et al. | 138/149 |
| 4,659,871 A | * | 4/1987 | Smith et al. | 174/113 R |
| 5,020,481 A | * | 6/1991 | Nelson | 122/494 |
| 5,611,374 A | * | 3/1997 | Blin et al. | 138/149 |
| 6,403,182 B1 | | 6/2002 | Plummer et al. | 428/36.9 |

OTHER PUBLICATIONS

Patent Abstracts of Japan, JP 09–014578 (Dia Chem KK) Jan. 1997 (1 page).

Document Bibliography and Abstract of EP0297612, published Jan. 4, 1989 (Missel GmbH & Co.).

Document Bibliography and Abstract of JP8014483, published Jan. 16, 1996 (Sanyo Electric Co. Ltd.).

Document Bibliography and Abstract of DE3906708, published Dec. 6, 1990 (Partek Corp.; Willich Daemmstoffe & Zubehoer).

Document Bibliography and Abstract of DE4225448, published Feb. 3, 1994 (Janich GmbH & Co.).

Abstract of SU–706271, published Dec. 31, 1979 (Zhdanovtyazhmash).

Abstract of SU1104339, published Jul. 23, 1984 (Andreev VA).

Abstract of SE8804–482–A, published Jun. 13, 1990 (Abb Carbon AB).

Abstract of DE29618681, published Oct. 27, 1996 (W. Hoefler).

\* cited by examiner

INSULATION MODULE, SYSTEM AND METHOD FOR INSTALLATION AND MANUFACTURE

This invention relates to an insulation module; a system of modules for insulating a component; a method of installation of the insulation modules; and a method of manufacture of the insulation module.

The purpose of insulation is well known, it is to reduce the impact of ambient environmental conditions on desired temperature within the insulated environment by reducing the heat transfer driving force between the insulated and ambient environments. The insulation operation involves the location and fastening of layer(s) of insulating materials, which may be of the same or different nature, about the component to be insulated. The installation may involve wrapping of an insulating material about the component but other constructions, for example panel constructions, which are adhered or otherwise secured to the component may also be employed.

In the industrial context, the object of insulation of a component is to maintain a desired temperature within that component. Thus in a chemical plant, tanks and pipes may hold or carry materials such as solids, gases or liquids which must be maintained within controlled temperature limits for efficient use within the process being conducted within the chemical plant.

Achievement of this objective is directly linked to the cost efficiency of the chemical plant as heating and cooling costs may be substantial and may be reduced by effective insulation to prevent heat loss or gain from the insulated component.

Insulation of a chemical plant is an expensive process. Generally, it has involved the installer in the transport of the necessary cladding and insulation materials to the site where it is then manufactured into the desired form to complete the insulation job. Therefore, the process is time consuming and requires a great deal of organisation to be competently and cost effectively carried out.

Further, there are some insulation materials which, though highly suitable for the purpose of insulation, are nevertheless considered to pose such a risk to the workers on a site that all non-insulation work must cease while the insulation is installed. This may necessitate working in night environments where the costs of lighting and incidental costs of employment are commensurately higher than during the day.

Typical of such insulation materials are fibres, particularly man-made materials such as synthetic or natural mineral fibres. One such fibre typically used in chemical plants is fibreglass. The work restraints described above are very pertinent to this fibrous material.

It is the object of the present invention to provide insulation modules, systems and methods for the manufacture and installation of these which avoid, to the maximum practical extent, the cost and safety disadvantages of current techniques while achieving the insulation objective.

With this object in view, a first aspect of the invention provides a pre-formed insulation module having a body shaped to a component to be insulated including:

an unstriated insulation layer shaped to the body comprising a rigid fibrous insulating material having fibres sealed, having no specific orientation relative to the module, within said layer by a sealing agent and being substantially uniform in composition and density over a cross section of said layer which has an inner surface adjacent to a surface of a component to be insulated; an outer surface and contacting surfaces;

a substantially non-fibrous resilient cladding layer shaped to the body and directly adhered to the insulation layer at the outer surface thereof; and connection means disposed along the length of the body for hingelessly connecting with at least one further adjacent insulation module wherein said insulation and cladding layers of said module are disposed relative to each other such that, on connection to said further insulation module, insulation layers of said module and said at least one further module are brought into contact along said contacting surfaces of the insulation layers of the modules for insulating at least a portion of the component.

By pre-formed is meant that the insulation module may be manufactured, as a complete insulating article, prior to transfer to, and installation at, a factory site. The factory site may be very remote to the site where the manufacturing plant is located. Such pre-fabrication of modules, which may be installed directly at the site, saves significant site costs and reduces the cost of the insulation project.

The insulating material is a fibrous material. Fibres may be synthetic or natural and man-made mineral fibres are especially contemplated within the scope of the present invention. Alternatively, non-fibrous cellular materials such as polyurethane may be used as insulating material. The material may take any suitable rigid or flexible form, for example panels, mattresses or blankets.

Suitable materials may be selected from fibrous materials in rigid form, rigid polyurethane foam and polyisocyanurate foam. Modules may be designed with insulation materials suitable for high temperature applications as might be encountered in chemical plants and oil and gas refineries and installations where temperatures may be required to be maintained in excess of the boiling point of water.

The pre-formed module may be made up of any desired number of insulating layer(s) and any desired number of cladding layer(s). The insulating layers must include at least one layer of a fibrous material, but may include further layer(s) of insulating materials of same or different nature. Insulation materials may be blended together. The construction of the pre-formed module will be dependent upon the nature of the insulation job and the cost acceptability of the module.

The insulation module is provided with means to connect the module with another such module. Thus, in the case where the component to be insulated is a pipe or pipe fitting, such as an elbow or T-joint, a pre-formed module may cover a portion of the pipe or pipe fitting. That module is connected to another module or series of modules to complete the insulation of the pipe or pipe fitting.

Conveniently, the modules in this instance may be semi-cylindrical in geometry though the module may be a fractional cylinder of any desired circumferential extent. It may be found that semi-cylindrical modules are suitable for insulation of pipes to about 200 diameter, above that diameter the modules may be made a lesser fraction of a cylinder in circumference. That is it may be found more convenient to use more than two modules to insulate a length of pipe. It will be understood that the module need not be limited in its application to the insulation of pipes and may not be circular or part circular.

In an advantageous embodiment, the pre-formed insulation module is a part-cylindrical module, say a semi-cylindrical module, with cladding layer overlapping the insulation layer along the length of the module on both sides of a longitudinal axis thereof such as to overlap with a cladding layer of a further module for at least partial connection therewith for insulating a component. The module may be provided along its length with circumferential beads and/or longitudinally extends to assist in connection to further modules for insulation of a component to be insulated.

Many components such as tanks may be insulated using similar pre-formed modules which need not be at all cylindrical in geometry. The determining factors in selection of the design of the module are as follows: the geometry of the component to be insulated, insulation requirements and cost.

The sealing agent sealing the mineral fibres must be such as to substantially contain the fibres in normal use, that is substantially preventing environmentally unacceptable (as dictated by standards or regulations) escape or detachment of fibres, during normal use. Many sealing agents may be suitable for this application, typically allowing a rigid fibrous material to be produced. They may be sprayed or otherwise applied to the mineral fibre product sourced from the mineral fibre supplier to achieve sealing. An acrylic emulsion has been found to be a suitable agent which is applied to the mineral fibre product by spraying.

The module may be manufactured in any convenient manner but generally the fibrous insulating material is cut to shape, that is the shape of the component, or part of a component to be insulated, sealed with the sealing agent and then adhered to a cladding material.

The cladding material may be formed from a metal such as stainless steel, coated steel or aluminium; or a polymeric material. The cladding material could be a composite material. It should be resistant to environmental and plant conditions. Typically, the cladding material would be formed into a resilient part-cylindrical sheet, that maintains some degree of resilience following fabrication into pre-formed modules. The cladding requires both temperature and corrosion resistance. It is directly adhered to the insulating layer by adhesives or other means. Possibly the sealing agent for sealing the matrix of material may be used as the adhesive agent.

The insulation module may be secured into position by fitting onto the component to be insulated, advantageously directly contacting it. The fitting should take account of any thermal expansion and contraction of the insulated component. The module may also be provided on the inner surface of the insulating layer with connection means which connect it to the component, or a part of the component to be insulated. Modules can be interference or otherwise fitted together. Resilience of the cladding layer assists such connection. The connection means may be mechanical or chemical in nature but must be durable taking into account environmental and plant conditions. For example, a chemical connection means such as an adhesive would require to be temperature resistant and resistant to small leakage or small plant concentrations of process materials. The connection means should allow water-tight sealing.

In a further aspect of the invention, there is provided an insulation system for insulating a component comprised of pre-formed modules, as described for the first aspect of the invention, adjacent modules being connected together by connection means to form the insulation system insulating the component.

In a still further aspect of the present invention there is provided a method of insulating a component comprising manufacturing pre-formed modules; and as described for the first aspect of the invention; and securing pre-formed modules to a component, or part of a component, and other modules to enable insulation of that component or part of the component.

Pre-formed modules making up the insulation may be connected to one or more adjacent module(s) and/or to the component or part of the component as above described.

In a still further aspect of the present invention there is provided a method of manufacturing an insulation module comprising forming a rigid insulation layer of insulating material; sealing the insulating material by application of a sealing agent; forming a substantially non-fibrous cladding from cladding material; forming connection means on at least one of said cladding and said insulation layer; assembling the cladding and insulation materials; and forming the assembly into insulation modules for insulating components.

Conveniently, the sealing process is accomplished by spraying a sealing agent, onto the insulating material. Other sealing agents and methods of application to the insulating material could be employed.

Sealing agents found to be most useful include those based on acrylic emulsions such as JONCRYL 74F, a trade mark of Albright and Wilson, and PRIMAL RHA-691, a trade mark of Rohm and Haas Inc. Contained within such emulsions are fire retardants, advantageously alumina trihydrate, and stabilisers for preventing particles of fire retardant coming out of suspension. It may be useful for the flame retardant to be added at a level to constitute 60% by weight of a sealing film formed by the sealing agent on the insulating material. As a guide, a proposed sealing agent formulation would include:

| Agent | Parts by Weight |
|---|---|
| JONCRYL 74F | 450 |
| Alumina Trihydrate | 450 |
| Propylene glycol | 70 |
| Carrybon L400 (Henkel) | 27 |
| Flexobrite Blue C5 | 6 |

The insulation and cladding materials may be shaped, say into a cylindrical or other suitably shaped pre-form with controlled thickness as required for effective insulation, and adhesive may be sprayed onto the surface of the cladding material to be adhered to the sealed matrix of insulating material.

In the case of insulation pre-forms these should be substantially uniform in composition and density across a given cross-section. The pre-forms should be unstriated, that is, not assemblages of plural narrow strips of material adhered together leaving striations at the adhered edges.

The adhesive agent is then applied to the pre-form of insulating material which is then adhered to the cladding material. It is also possible for the adhesive agent to be applied only to one of the insulating or cladding layers. Other methods of application of adhesive or adhesion, that is fastening or connection, could be used in accordance with the invention.

The module, system and method of installation forming the various aspects of the present invention present cost and safety advantages over systems and methods currently employed for insulation. Insulation modules are also readily replaceable in the event of service failure.

The various aspects of the invention may be more completely understood from the following description of preferred embodiments thereof made with reference to the accompanying drawings in which.

MODULES

Figure 1A:
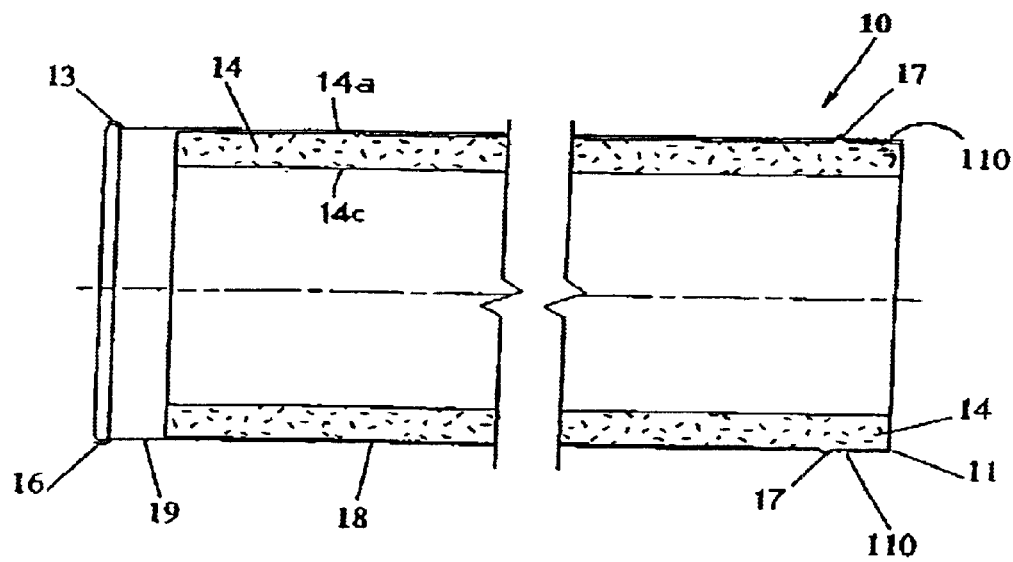
FIG. 1a is a side sectional view of a pre-formed module suitable for insulation of a length of pipe made in accordance with one embodiment of the present invention.
Figure 1B:
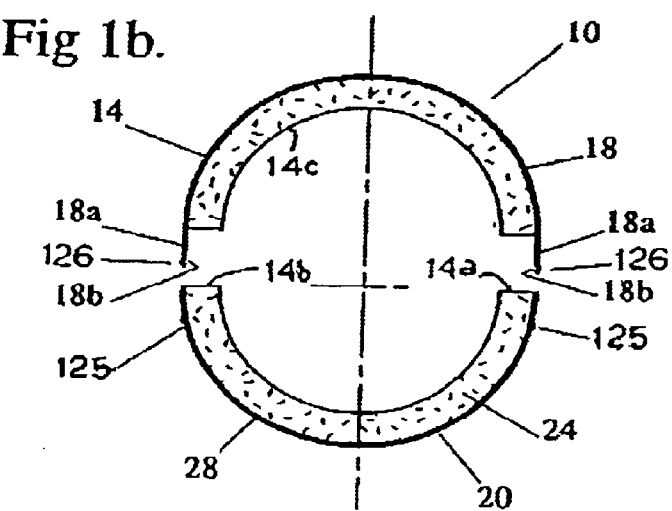
FIG. 1b is an exploded view of two pre-formed modules showing the assembly.

Referring now to FIG. 1, there is shown an insulation module 10 fabricated in accordance with one embodiment of the invention. The module 10 is of semi-cylindrical shape suitable for use in the partial insulation of a pipe, partial because the insulation module will need to co-operate with further modules to completely insulate the pipe. Modules may be designed which allow insulation by a single module of hinged or analogous construction.

The module 10 has an insulation layer 14 and a cladding layer 18. These layers are, in the case of a semi-cylindrical module, substantially semi-cylindrical and co-axial. The insulation layer 14 sits within the cladding layer 18 and a neat fit is envisaged though, in the embodiment shown, an adhesive agent is employed to secure assembly of the outer surface 14a of the insulation layer 14 and cladding layers 14 and 18. Inner surface 14c of insulation layer 14 is intended to contact a pipe to be insulated. A separate and distinct adhesive layer could be formed during manufacture. It will be seen that the cladding layer 18 is formed with greater circumferential extent than the insulation layer 14. The overlapping portions 18a are connection means designed to overlap circumferentially with the cladding layer 28 of another insulation module 20 of substantially similar construction to module 10 except that the insulation and cladding layers 24 and 28 are of substantially similar circumferential extent with contacting surfaces 14ba of insulation layer 24 formed substantially flush with longitudinal edges of cladding layer 28. Other connection means of mechanical or chemical nature may be employed instead of, or additionally to, the connection means or overlapping portions 18a described.

Figure 3:
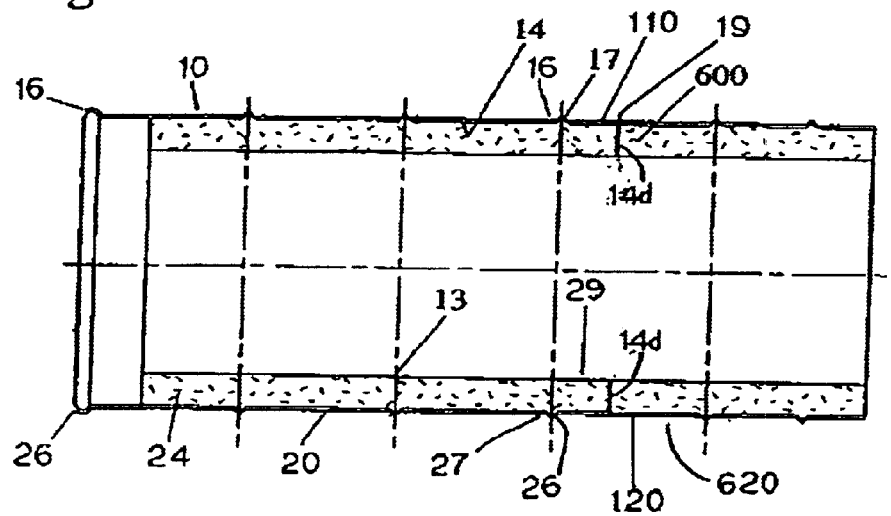
FIG. 3 is a front sectional view of a system of modules as shown in FIGS. 1 and 2 insulating a length of pipe.

Thus module 10 is formed with circumferential beads 16 and 17; and module 20 with circumferential beads 26 and 27. The beads may be connected by longitudinally extending beads 126. Beads 16 and 26 are formed at ends 13 and 23 of modules 10 and 20. Beads 16, 17, 26 and 27, shown of V shape but other shapes are not excluded, strengthen the module and may act as water seals, preventing water ingress by capillary action. In the embodiment shown, bead 126 formed on overlapping portion 18a of cladding layer 18 of module 10, is generally V shaped presenting on the inner face 18b of overlapping portion 18a a V shaped channel which accommodates the complementary inverted V shaped bead 125 of module 20. Accommodation may involve an interference fit to achieve fastening but other connection means could be adopted. As shown in FIG. 3, the connection of modules 10 and 20 may be made more secure by spot welding or riveting. Water sealing agents or tape may also be employed for water-tight sealing.

Modules 10 and 20 are designed such that the cladding semi-cylinders are of greater length than the insulation semi-cylinders. Thus at ends 11 and 21 of the modules 10 and 20 the cladding and insulation cylinders are co-terminous. At the ends 13 and 23, the cladding semi-cylinder extends past the end of the insulation semi-cylinder forming connection portions 19 and 29. These connection portions 19 and 29 are intended to overlap one end of adjacent insulation modules to be fastened thereto, as shown in FIG. 3, in the manner typical of connection of pipes in the plumbing art. Beads 16 and 26 assist the fastening, in much the same manner as described above, with complementary beads on adjacent modules. Bead 126 may similarly co-operate with a corresponding longitudinal bead 125 and be made water-tight. Welding or riveting may be employed, particularly with the circumferential beads 16, 17, 26 and 27, to complete the job by forming a substantially continuous and complete insulation layer along the length of pipe or along the surface of a component to be insulated when the adjacent modules are correctly engaged. Fastening could also be achieved using screws or by strapping of the modules together by metal bands. The fastening is such as to achieve a water-tight seal. Joints may be taped with water-proof tape for this purpose or sealants, such as silicone sealants, may be employed.

Figure 2:
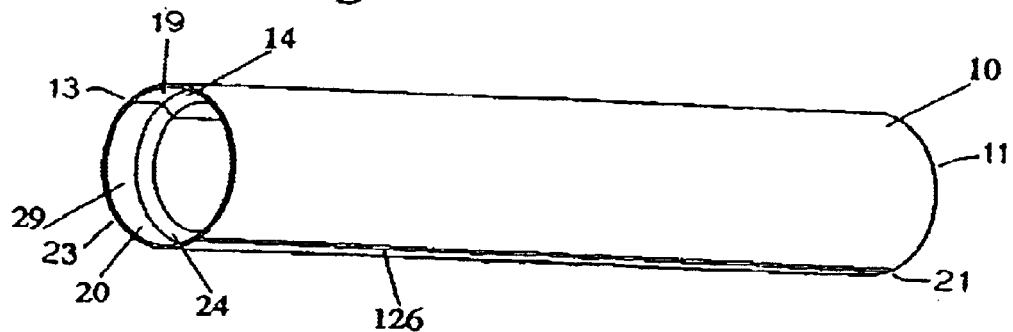
FIG. 2 is a perspective view of two pre-formed modules fitted together to insulate a portion of a pipe in accordance with a second embodiment of the invention.

Referring to FIGS. 1 to 3, and considering the modules 10 and 20 that have been described, the overlapping end portion of each module is marked 110 and 120 respectively. The connection portions 19 and 29 of adjacent modules 600 and 620 are of substantially the same length as the end portions 110 and 120 which are terminated at one end by beads 17 and 27. Connection portions 19 and 29 are intended to be slid over the end portions 110 and 120 of adjacent modules, for example, 10 and 20, until prevented from further movement by beads 17 and 27. Thus beads 17 and 27 act as gauges during assembly showing that adjacent modules have been correctly secured together, the final fastening being made by riveting or spot welding or otherwise using water sealing agents and tape as appropriate. At this point, the insulation layers of the adjacent modules 10, 20, 600 and 620 come into contact along their contacting surfaces 14d, secured if desired, forming a substantially continuous and complete insulation layer along the length of the pipe. Gaps and breaks in the insulation are most advantageously to be avoided.

Figure 4:
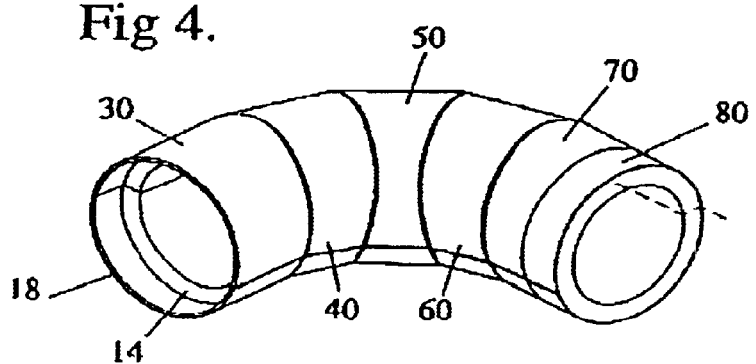
FIG. 4 is a front sectional view of a system of modules insulating a pipe fitting being an elbow.

Modules 10 and 20, as described above, are suitable for insulation of substantially straight lengths of pipe. The modules may be customised for insulation of pipe fittings as well as other components. FIG. 4 shows a series of insulation modules 30, 40, 50, 60, 70 and 80 shaped and cut to suit the radius and degree of a bend or elbow in a pipe to be insulated.

Method of Manufacture of Modules

Figure 5:
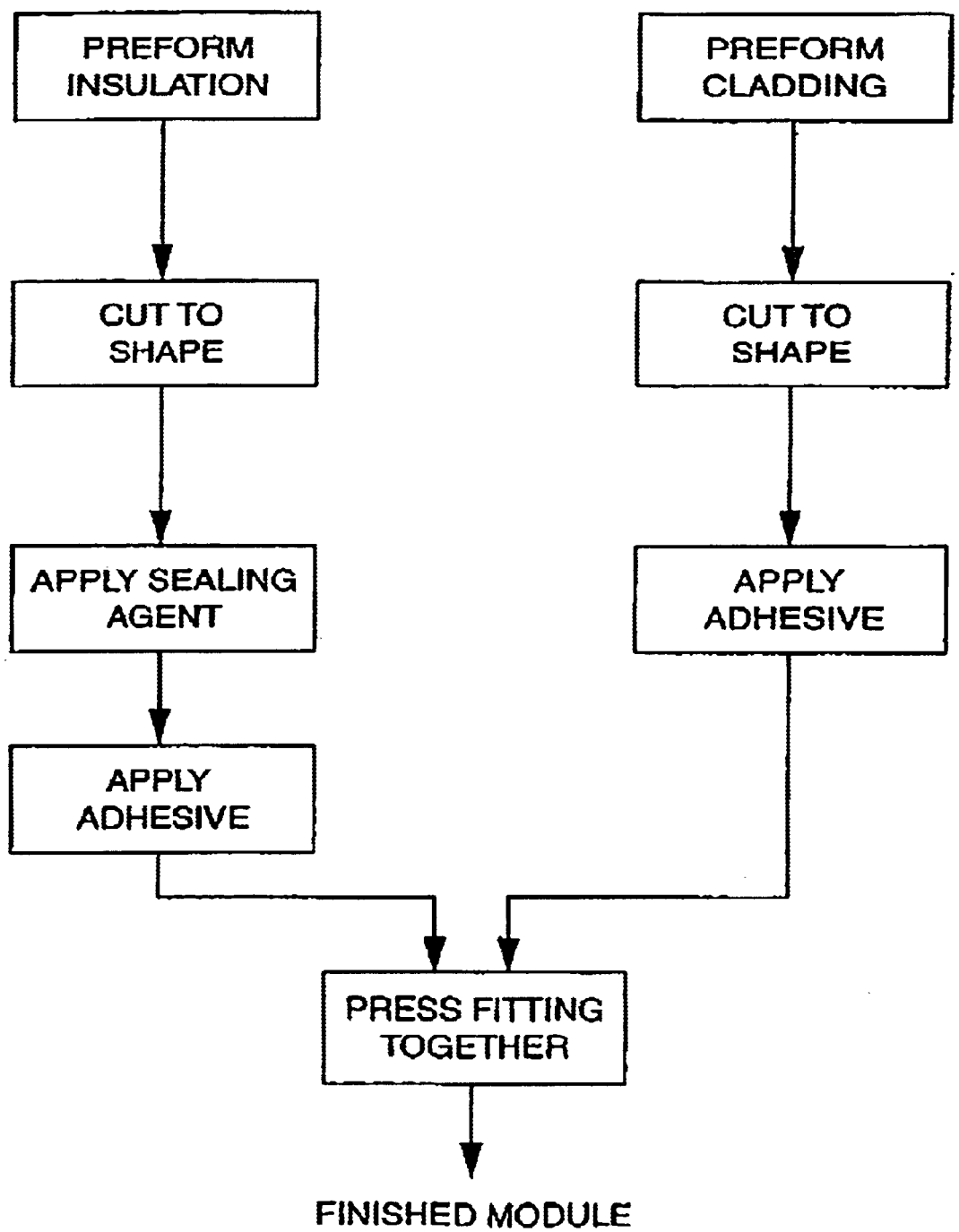
FIG. 5 is a schematic flowchart of the manufacturing operation of an insulation module in accordance with the invention.

The manufacture of the insulation modules 10 and 20 is shown schematically in FIG. 5.

The material forming the insulation layer 14 may be supplied in the form of a hollow cylinder, of substantially uniform composition and density across a given cross-section. The hollow cylinder is cut substantially along a centre line thereof to allow formation of the insulation layer 14. The linear diameter of the cylinder and thus the insulation module 10 is selected to allow an engineered clearance to a pipe to be insulated.

The fibres making up a fibrous insulation material may be natural or synthetic, typically mineral, fibres such as fibreglass. It is such materials that have posed safety difficulties in on-site manufacture and installation in the plant. Cellular materials may also be employed, for example rigid cellular polyurethane foams as manufactured and supplied by the Applicant. Such materials may advantageously take the place of fibrous materials as described.

The cylindrical pre-form of the fibreglass may be sprayed with acrylic emulsions, for example as described above, or other suitable sealing agent to seal the insulating material. Sealing prevents escape of substantial quantities of fibres and unsatisfactory levels of such fibres in the insulation environment. Spraying could be replaced with alternative methods for applying the sealing agent, say dipping or brush application or other methods of application.

The application may be done before or after other manufacturing steps but typically prior to adhesion of the cladding material as prior application of the cladding layer may prevent proper sealing of the insulation material.

Typically the cladding material is metallic in nature, say of stainless steel, coated steel or aluminium. Polymeric or composite materials could also be used. In other words, the cladding material should be resistant to plant conditions, particularly corrosion and temperature resistance. The cladding material may be painted and advantageously, in contrast to prior proposals, retains resilience when formed into a cladding layer of the pre-formed insulation modules 10 and 20.

The cladding is likewise preformed into cylindrical (or other shape) lengths though having greater outer diameter than that of the cylinder of insulating material, it being remembered that overlapping portions 18a must preferably be formed for one of the modules, module 10. Beads may be formed both circumferentially and longitudinally to assist in fastening as above described. The circumferential beads may intersect an axis of a module at any desired angle. The pre-form may then be cut to semi- or part-cylindrical or other suitable shape.

The finished modules 10 and 20 are formed by combination of adhesive and appropriate fitting techniques, for example neat or interference fitting techniques, to secure the insulation material within the cladding 18. A tight fit is desired. Loose fitting or loose packing of insulation material within cladding 18 is not advantageous. Following setting or curing of the sealing agent to seal the insulation material, the adhesive may be sprayed onto one outer surface 16 of the semi-cylinder of insulation material following which it may be fitted and adhered to the semi-cylinder of cladding material to which adhesive has also been applied on an inner surface of the cladding pre-form. Alternatively, the cladding material only may be sprayed or otherwise provided with a layer of adhesive, the insulation pre-form being pressed into position. Either the cladding or insulation materials or both could have an adhesive layer applied to them to allow adhesion. Any adhesive must be suitable for adhesion of metallic and fibrous materials. The adhesive must be suitable for durable use in the insulated environment. A solvent based adhesive sourced from Bostik under the trade name Bostik 1831 has been found suitable.

It is not absolutely necessary for adhesives to be used, the cladding and insulation layers 14 and 18 could be secured together by chemical bonding or mechanical techniques. Nevertheless the use of adhesives is recommended for cost efficiency and practical reasons. Direct adherence is required for insulation efficiency. It is most important that the insulation and cladding layers 14 and 18 of the module 10 do not delaminate during transport to the site or before expiry of their service life.

The insulation modules 10 and 20 may be formed in lengths or customised to any particular component to be insulated, particularly for particular components, such as pipe fittings in a process plant though other applications for the modules may be envisaged. A kit of modules could be formed by cutting the lengths to smaller convenient sizes on-site or in the factory. These sub-modules are then available for installation at the plant. It may be understood that lengths and number of modules should be convenient for cost-effective transport to site.

In the case of a bend or elbow, as described in relation to FIG. 4, suitably shaped pre-forms of fibreglass and cladding material to accommodate the elbow are obtained and assembled in the same manner of manufacture as modules 10 and 20 with cutting of the modules 30–80 to the requisite shape.

Method of Insulation

The installation method for a pipe or pipe fitting proceeds as follows. From design data, the pipe length is determined and insulating modules of the same kind as modules 10 and 20 described above are manufactured to allow insulation of that pipe. For a given length of the pipe, two semi-cylindrical modules are required. A greater number of modules could be used where pipe diameter suggests that modules of lesser circumferential extent than semi-cylindrical are more conveniently to be installed on the pipe. One module 20 is then press fitted onto the pipe. The other module 10 is likewise fitted onto the pipe with overlapping portions 18a of the cladding fitting over the surface of the first module 20 to connect them together on interference fitting of bead 16 within channel 26. Insulation layers 14, 24 of adjoining modules 10, 20 should contact along their contacting surfaces 14ba. The modules should advantageously also make contact with the component to be insulated. Welding or riveting or other fastening is employed to complete the job. This is especially done at the circumferential beads though could also be done along the longitudinal beads 126. Water-tight sealing is advantageous. This may be achieved with water-proof tape and/or sealants such as silicone sealants.

Use of two modules is unlikely to insulate an entire pipe, other like modules are probably to be employed. In this case, adjacent modules must co-operate and be connected together to properly insulate the pipe. As has been described above, connection portions of modules 10 and 20 are overlapped with the end portions of an adjacent module and with each other suitably securing adjacent modules together to create a water seal particularly when supplemented by use of welding, rivetting and/or use of sealants and a substantially continuous and complete insulation layer along the length of pipe.

This process proceeds until the entire pipe is insulated. The invention is applicable to insulation of plant components other than pipes in which case design data is first sought for the component and pre-formed modules manufactured for the insulation job. The module(s) and systems may be utilised in concert with conventional insulation methods where design features of the plant recommend this.

Modifications and variations may be made to the present invention or consideration of the disclosure by the skilled reader of this disclosure. Such modifications and variations are considered to fall within the scope of the present invention.

What is claimed is:

1. A part-cylindrical pre-formed insulation module for insulating a component including:
 an unstriated insulation layer with an inner surface for contacting an outer surface of the component to be insulated and comprising insulating material having fibres substantially in contact with one another throughout said insulating material and entirely sealed over said inner surface by a sealing agent, said fibres having no specific orientation relative to the module within said insulation layer, said insulation layer being substantially uniform in composition and density over a cross section thereof, said insulation layer including an outer surface and contacting surfaces;

a substantially non-fibrous, resilient cladding layer shaped to the component to be insulated and directly adhered to the insulation layer at the outer surface thereof; and connection means disposed along the length of the body for hingelessly connecting with at least one further adjacent insulation module wherein said insulation and cladding layers of said module are disposed relative to each other such that, on connection to said further insulation module, insulation layers of said module and said at least one further module are brought into contact along said contacting surfaces of the insulation layers of the modules for insulating at least a portion of the component.

2. The module of claim 1 having first and second ends and a circumferentially extending bead extending about a circumference of said module at a distance from said first end thereof.

3. The module of claim 2 having a circumferentially extending bead at said second end thereof.

4. The module of claim 2 wherein said insulation layer finishes flush with said cladding layer at said first end of said module.

5. The module of claim 4 wherein said cladding layer extends beyond said insulation layer at said second end of said module.

6. The module of claim 5 wherein said sealing agent forms a sealing film on said insulation layer.

7. The module of claim 1 wherein a channel extending along a length of said module forms said connection means.

8. The module of claim 1 wherein said module is semi-cylindrical and two beads extending along a length of said module on an outer surface of said module form said connection means.

9. The module of claim 1 wherein said module is semi-cylindrical and two diametrically spaced apart channels form said connection means.

10. A pre-formed insulation module system for insulating a length of pipe comprising first and second semi-cylindrical modules each having:

an unstriated insulation layer with an inner surface contacting an outer surface of said pipe and comprised of rigid fibrous insulating material having fibres substantially in contact with one another throughout said insulating material and entirely sealed over said inner surface by a sealing agent, said fibres having no specific orientation relative to the module within said insulation layer, said insulation layer being substantially uniform in composition and density over a cross section thereof, said insulation layer including an outer surface and longitudinally extending contact surfaces; and a substantially non-fibrous resilient cladding layer directly adhered to said insulation layer at said outer surface thereof, wherein said first module has two diametrically spaced channels extending along its length and said second module has two beads extending along its length, said beads being accommodated within said channels to fasten said first and second modules together by interference fitting.

11. A pre-formed insulation module system as claimed in claim 10 for insulating a first length of pipe wherein said first and second modules have first and second ends and circumferentially extending beads being distanced from said first ends of said first and second modules on outward surfaces thereof said beads being accommodated within channels disposed on inward surfaces of second ends of said first and second modules of an adjacent insulation module system insulating a second length of pipe integral with and adjacent the first length of pipe such that said module systems insulating said first and second lengths of pipe are fastened together.

12. A pre-formed insulation module including:

an insulation layer having fibres substantially in contact with one another throughout said insulation layer, said fibres being sealed within said layer by a sealing agent comprising an acrylic emulsion extending entirely over said insulation layer and having an inner surface for contacting a component to be insulated and an outer surface; and a substantially non-fibrous resilient cladding layer directly adhered to the insulation layer at said outer surface thereof.

13. The module of claim 12 being semi-cylindrical.

14. The module of claim 13 wherein said acrylic emulsion contains a flame retardant.

15. The module of claim 12 wherein said sealing agent forms a sealing film on said insulation layer, said film containing flame retardant.

16. The module of claim 15 wherein said flame retardant is alumina trihydrate.

17. The module of claim 16 wherein said flame retardant constitutes 60% by weight of said sealing film.

18. The module of claim 15 wherein said flame retardant constitutes 60% by weight of said sealing film.

19. The module of claim 16 wherein said sealing agent includes acrylic emulsion, alumina trihydrate and propylene glycol.

* * * * *

UNITED STATES PATENT AND TRADEMARK OFFICE
CERTIFICATE OF CORRECTION

PATENT NO. : 6,921,564 B1
APPLICATION NO. : 09/674688
DATED : July 26, 2005
INVENTOR(S) : Keenan It is certified that error appears in the above-identified patent and that said Letters Patent is hereby corrected as shown below:

Column 10, lines 47 and 48, claim 18 should read,

18. The module of claim 16 wherein said flame retardant constitutes 60% by weight of said sealing film.

Signed and Sealed this

Thirty-first Day of October, 2006

JON W. DUDAS
*Director of the United States Patent and Trademark Office*